United States Patent [19]

Jacobs

[11] 4,165,244

[45] Aug. 21, 1979

[54] SOLDERING FLUX AND METHOD OF USING SAME

[76] Inventor: Norman L. Jacobs, 3102 Milam St., Houston, Tex. 77006

[21] Appl. No.: 844,224

[22] Filed: Oct. 21, 1977

[51] Int. Cl.$^2$ .............................................. B23K 35/34
[52] U.S. Cl. ........................................ 148/23; 148/25
[58] Field of Search ............................. 148/23, 24, 25

[56] References Cited

U.S. PATENT DOCUMENTS

| | | | |
|---|---|---|---|
| 3,837,932 | 9/1974 | Aronberg | 148/23 |
| 3,895,973 | 7/1975 | Stayner | 148/25 |
| 3,944,123 | 3/1976 | Jacobs | 148/25 |

Primary Examiner—P. D. Rosenberg
Attorney, Agent, or Firm—Pravel, Gambrell, Hewitt, Kirk, Kimball & Dodge

[57] ABSTRACT

Soldering fluxes and methods of using same for soldering metals with solders which are molten below 400° C. wherein the flux functions efficiently but with an absence or minimum of spattering of particulate solder or reaction products between the solder and flux. Soldering fluxes according to this invention can be utilized in any soldering application and by any method of soldering where it is desirable to eliminate or reduce spattering.

A few examples of common soldering compositions in this category are tin, tin and antimony, tin and lead. One example of the use of such fluxes is in the soldering of tinplate can bodies whereby it is possible to minimize or substantially eliminate the contamination of the can body by the lead component of the solder when lead bearing solders are used.

When soldering printed circuit boards for the production of electronic and electrical equipments using the soldering flux of this invention, the minimal or absence of spattering can significantly reduce residual electrical conductivity between circuits.

8 Claims, No Drawings

SOLDERING FLUX AND METHOD OF USING SAME

BACKGROUND OF THE INVENTION

It has long been well-known that lead contamination on the interior surface of lacquered and unlacquered can bodies soldered with lead bearing solder is detrimental, particularly where the cans are used for packaging food, beverages, cosmetics and drugs consumed by humans, especially infants. As a result, government health authorities are concerned that this lead which adds to the total lead consumed from all sources, should be below maximum limits for the health and safety of consumers.

One of the most difficult problems in the past has been the control of the spattering of the solder during the soldering operation. Such spattering of the solder results in a relatively large amount of particulate lead being deposited on the inside of the can body in the area adjacent to the seam, especially near the overlapping ends and at the seam laps. The fluxes which have heretofore been used have been responsible for such spattering because when they came in contact with molten solder, at the high temperatures employed during soldering, usually in the vicinity of 350° C., various volatile materials such as water, lower boiling acids and decomposition products were explosively evolved causing the lead matter to spatter, especially as the available exits for the exploding gases are the narrow crevices of the seam and the capillary gaps of the laps.

Conventionally, previous fluxes comprise such substances as zinc ammonium chloride, carboxylic acids, amines, alcohols, water by itself and water, which can be produced as a reaction product between acids and metal oxides during soldering or be present as an impurity. In addition, many carboxylic acids used in previous flux compositions are subject to dehydration or decarboxylation when strongly or rapidly heated, forming gaseous decomposition products such as water, oxides of carbon and low molecular weight olefins together with various oxygenated hydrocarbons such as ketones. In addition, nitrogeneous bases react with derivates of carboxyl groups forming amides and similar substances with the evolution of water and other gases, provided they are sufficiently involatile to remain during heating. Alcohols such as isopropanol, traditionally used as a solvent, assist in retention of water in previous flux compositions as an impurity, sometimes until the critical spattering temperature is reached during soldering, by hydrogen bonding and other coordinations. All of the above substances can be formed or volatilized so rapidly that their evolution is explosive and thus they spatter the particulate lead, lead reaction products of soldering and other matter present during soldering at the interface of the molten solder and previous fluxes. Examples of such fluxes would be a solution in isopropanol of the monoethanolamine, salt of sebacic acid and an isopropanol solution of monoethanolamine hydrochloride with either zinc chloride or a rosin or other carboxylic acid.

SUMMARY OF THE INVENTION

This invention relates to new and improved soldering fluxes and methods of using same for soldering metals with solders which are molten below 400° C. wherein the flux functions efficiently but with an absence or minimum of spattering of particulate solder or reaction products between the solder and flux, as well as any other matter present during the soldering operation. The volatile substances which are explosively evolved from previous fluxes have been eliminated from the flux compositions according to this invention.

DESCRIPTION OF THE PREFERRED EMBODIMENT

The four principal properties required of a soldering flux are:

1. The ability to remove metal oxides and other residual substances on the surface of the metal to be soldered;
2. The ability to dissolve reaction products and keep the surface of the metal to be soldered free of oxides during the soldering process;
3. The ability to similarly chemically clean the leading edge of the advancing molten solder; and
4. The ability to be easily pushed aside by the advancing molten solder and not form an impediment to wetting.

Preferably, soldering fluxes should possess toxological properties of a low order and not represent corrosion hazards towards the pieces being soldered, the soldering equipment and the like by virtue of the fluxes, their surpluses and residue being subject to hydrolosis and other corrosion-inducing situations as is common with halide-bearing compositions.

The fluxes of this invention possesses all of the four properties listed above by virtue of having adequate chemical activity to perform the fluxing function, suitable physical properties as described herein, and will not evolve any significant quantity of volatile material either as an impurity or decomposition product during soldering. In this way, spattering is drastically minimized or eliminated.

In connection with the production of tinplate can bodies, high lead bearing solders are usually used, with a typical solder being one having ninety-eight percent (98%) lead and two percent (2%) tin. This invention is particularly suited for the soldering of seams such as the longitudinal or vertical seam of a tinplate can body to form the cylindrical portion of the can. As will be more evident hereinafter, one of the major advantages of the present invention is the avoidance of spattering of the flux, solder and reaction products during the soldering operation. The avoidance or minimizing of the spattering is particularly significant where the high lead bearing solder is used because that minimizes the amount of lead deposit left on the inside surface of the can body. Further, the spattered matter, whether it be lead or tin or the salts of these metals or other materials, may result in corrosion or blemishes on the piece being soldered. Although the present invention is particularly suitable for the soldering of tinplate components, it may also be utilized in the soldering of electrical circuits, for example in a printed board, wherein spattering of the solder or flux is undesirable because the spattered solder or flux could be a source of undesired electrical conductivity, corrosion or blemishes. Moreover, fluxes prepared according to this invention will have distinct advantages over previous fluxes in all soldering applications where non spattering fluxes are desirable.

The common method of manufacturing tinplate can bodies is by conventional solder roll soldering. By this process, lead contamination has previously resulted from the soldering itself being flux related and the subsequent wiping process to clean the seam externally after soldering. Lead contamination has been proven to result from both these processes. In the case of heat induction side seam soldering, the wiping process is eliminated and one process only is responsible for contamination. The same is applicable to lap seaming. In other types of can body production, the soldering itself is always responsible for lead contamination. In the case of can bodies which are internally unlacquered or uncoated, lead tends to plate out onto the tin surface because of its lower electro-chemical potential, but in the case of internally lacquered can bodies, there is no means of dispersion of lead content except into the packaged product. Presently, the United States, Canadian, several European and other governments are determining the maximum lead levels which shall be permitted in canned food products and the maximum amount of lead contamination that will be permitted as a result of the total can making process. For instance, the U.S. Government has proposed regulations of a maximum of 0.3 parts per million of lead for evaporated milk and may issue guidelines or regulations for infant foods. The government of the Dominion of Canada are currently considering figures of 0.15 parts per million of lead in respect to evaporated milk cans and prepared infant foods. Fluxes prepared in accordance with this invention drastically reduce the amount of lead contamination in tin can bodies manufactured as above when compared with that obtained with previous fluxes and therefore the use of these fluxes is a practical method of reducing lead contamination in soldering can bodies in all of the above-mentioned methods.

It was not uncommon to find that cans manufactured by conventional solder roll soldering contained 0.5 plus or minus 0.2 parts per million of lead when soldered with previous fluxes, whereas, cans soldered on heat induction side seam soldering machines usually had significantly lower amounts. For comparison purposes, the following test results were obtained:

1. Halide-bearing flux (prior art):

| Type of Soldering | Parts Per Million of Lead Contamination |
| --- | --- |
| Conventional Side Seam Soldering | 0.20-0.32 |
| Heat Induction Side Seam Soldering | 0.23-0.25 |

2. Flux* prepared according to this invention:

| Type of Soldering | Parts Per Million of Lead Contamination |
| --- | --- |
| Conventional Side Seam Soldering | 0.11-0.13 |
| Heat Induction Side Seam Soldering | 0.03-0.05 |

*The flux contained 50.0 parts by weight of doric acid (described below), and .25 parts by weight of stannous chloride catalyst, and 50.00 parts by weight of isopropyl acetate.

When soldering tinplate can bodies with solders containing 98% lead, the temperature is in the neighborhood of 350° C. and any volatile material as previously described will explode or violently escape from the liquid resulting in the spattering of the constituents present in the joint of the can seam as will be fully explained hereinafter.

Fluxes in accordance with the present invention, because of their minimal or total absence of spattering properties, may be used in methods of soldering electrical circuits with low residual conductivity between the circuits as well as methods of soldering in all applications where this property is desirable.

Soldering fluxes in accordance with this invention may have acid values (g/mg KOH) as low as 150 but preferred acid values are in excess of 250 and in the vicinity of 400 or over. The molecular weight of the fluxes is in excess of about 200 and preferably between 250 and 400, but in some cases can be in the vicinity of 800. The most important characteristics of fluxes according to this invention are that they shall be anhydrous, do not produce water, and do not give off explosive volatile substances during soldering.

By way of example, the major constituent of the soldering flux of this invention is an anhydride of a carboxylic acid. Such an anhydride may be derived from any mono or polybasic carboxylic acid. In the case of monobasic and dibasic, straight or branch chain aliphatic, mono and polyolefinic and ketonic acids, the total number of carbon atoms in the acid should be at least nine carbon atoms. In the case of anhydrides derived from benzene mono and polybasic carboxylic acids, the ratio of the total number of reactive carbonyl groups to the carbon atoms should be no greater than 1:4. The acid anhydrides in the foregoing groups of substance do not produce water during soldering, they are not volatile and they have a high acidity so that they are stable and are capable of reacting with the metal oxides for removal of same. These substances together with their reaction products in the flux melt possess a low enough melting point so that they readily flow at the soldering temperatures and are also readily pushed aside by the advancing molten solder. It is to be noted that the foregoing definition excludes trimellitic anhydride by itself or together with amines which has been proposed in U.S. Pat. No. 3,264,164, because such anhydride is unsatisfactory as a soldering flux due to the fact that the reaction products between the flux and the metallic oxides are of such a high melting point that the molten flux cannot be pushed aside by the advancing molten solder.

By way of a more specific example, the principal component of the soldering flux of this invention has the following chemical formula:

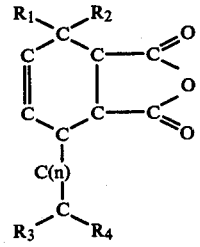

In the above formula, $R_1$ and $R_2$ are hydrogen or an organic hydrocarbon radical. $R_3$ and $R_4$ are hydrogen, an organic hydrocarbon radical, an hydroxyl group, or oxygen. Also, in the above formula, n is an integer greater than 1.

Examples of an anhydride of a carboxylic acid which can be a component of a soldering flux in accordance with this invention are the reaction products of conjugated polyolefins and conjugated polyolefinic acids and maleic anhydride. A specific example is the Diels Alder adduct between conjugated linoleic acid and maleic anhydride.

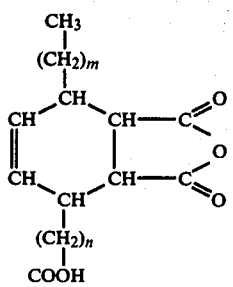

This substance has been given the trivial name of doric acid and that term will be used hereinafter. In the doric acid, m is 4 or 5 and n is 7 or 8.

Other anhydrides which may be used in this invention are tetrahydrophlathlic anhydride, bianhydrophlathic anhydride, and their substituted derivatives. Also, monobasic carboxylic acid anhydrides having at least 9 carbon atoms; dibasic carboxylic acid anhydrides of azelaic and sebacic acids preferably containing nonvolatile monobasic terminal groups, most advantageously of not less than 9 carbon atoms, the reaction product of maleic anhydride and polybutenes, five ring anhydrides such as maleic anhydride and succinic anhydride and substituted compounds thereof, for example dodecyl succinic anhydride, five and six ring and substituted five and six ring cyclic hydrocarbons with one or more attached anhydride groups, also anhydrides of substituted benzene acids and anhydrides of partially esterified mono and polybasic benzene acids having preferably 8 carbon atoms or more, all with a total carbonyl to carbon atom ratio of not greater than 1:4.

Other acid anhydrides that may be employed in the fluxes according to this invention may be prepared from mono and polyolefinic carboxylic acids such as oleic acid and non-conjugated Linoleic acid, respectively, as the ene adduct with maleic anhydride. In the case of non-conjugated Linoleic acid, such adduction forces conjugation, enabling a double adduct of maleic anhydride to be utilized. In some commercial fatty acids, linolenic acids are present, and this material may also be employed in adduction reactions for the preparation of flux compositions encompassed in this invention.

In the place of the carboxylic acids mentioned herein, esters and polyesters may also be employed as part of the basic hydrocarbon molecule containing one or more acid anhydride groups. This is particularly advantageous if it is desired to use a natural oil such as linseed oil, safflower oil, or sunflower oil or such triglycerides subsequent to conjugation for adduction with maleic anhydride. Also, such natural oils, even triglycerides, all of the monocarboxylic acids described herein, may be subject to acidolysis with maleic anhydride and even trimellitic anhydride which in this form may be utilized as fluxes according to this invention.

The use of esters or polyesters of the carboxylic acids containing one or more anhydride groups as fluxes of this invention has the advantage of removing the hydroxyl radical of the carboxylic acid group which can react in various aforementioned ways to yield water as a decomposition product during soldering. The properties of any flux composition in accordance with this invention may be modified by the use of one or more, or two or more, of any of the acid anhydrides mentioned herein.

Specifically, in the case of doric acid, the carboxylic acid group is relatively unreactive during the soldering process when an efficient catalyst is utilized to open the anhydride ring which more readily reacts with metal oxides than does the carboxylic acid group. Thus, it is possible to use doric acid as a component of a flux in accordance with this invention without any significant reduction in non-spattering properties even though it is possible to prepare an anhydride of the conjugated linoleic acid prior to the adduction of the stoichimetric amount of maleic anhydride, resulting in a dimer to which the name doric anhydride has been given.

The remainder of the soldering flux of this invention consists of other anhydrous materials which are non-reactive with the acid anhydride and which produce no water upon reaction during soldering. For example, to promote the opening of the anhydride ring without the use of much of the heat energy available from the soldering process itself, a catalyst is preferably used in the soldering flux. It has been found that the following materials are suitable catalysts: sodium stearate, potassium stearate, primary, secondary and tertiary alkyl amines, benzylamines and substituted derivatives having a molecular weight greater than about 100 and their salts with halogen acids, zinc chloride, manganese chloride, stannous chloride, stannic chloride, iron chloride, and aluminum chloride. More generically, the catalyst may be any substance soluble in the flux composition containing one or more of the following ions: $Na^+$, $K^+$, $Cu^{++}$, $Zn^{++}$, $Mg^{++}$, $Sn^{++}$, $Sn^{++++}$, $Bi^{+++}$, $Sb^{+++}$, $As^{+++}$, $Pb^{++}$, $Cr^{+++}$, $Mn^{++}$, $Mo^{+6}$, $Ag^+$, $Fe^{++}$, $Fe^{+++}$, $Al^{+++}$, for example as salts or soaps of stearic or oleic acid, alkyl sulfates and sulfonic acids, benzene or substituted benzene sulfates and sulfonic acids, alkyl sulfates and sulfonic acids, halogen acids, and organo-metallic complexes. One or more of such catalysts may be used with the various anhydrides identified above. The catalyst constitutes above about 0.05 percent by weight of the anhydride in the soldering flux, but the preferred amount being up to about 1.5% by weight, and with the maximum amount of the catalyst being about 15% by weight.

The soldering flux according to this invention should also include a solvent which will not react to form water and which does not contain water as an impurity, examples of which are: isopropyl acetate, methyl cellosolve acetate, methylisobutyl ketone, toluene, xylene. The amount of solvent which may be added may be varied in order to determine the desired strength of the flux. The amount should be sufficient to render the flux easy to spread, without running off of the surface to be soldered.

By way of example, if the doric acid, the chemical formula of which is set forth above, is used as the component anhydride for the flux, it may comprise from about fifteen percent (15%) to about sixty percent (60%) by weight in solution with the balance being either completely made up from the solvent such as one of those listed above, and preferably isopropyl acetate, or the solvent plus the catalyst such as stannous chloride which is present in an amount from about 0.05% to about five percent (5%) by weight of the doric acid.

In carrying out the method of this invention, the soldering flux according to this invention may be used with the common lead bearing solders such as one described above having about ninetyeight percent (98%) lead and two percent (2%) tin, but it could also be used with solders which are essentially all tin, or of other compositions. In the case of soldering can bodies, any of the conventional procedures for applying fluxes in accordance with this invention to the seam edges to be soldered, may be employed, such as flux wheels, brushes and jet apparatus and in a flux bath in the case of lap seaming, with solder being subsequently introduced.

In a preferred embodiment of this invention, the soldering flux is initially applied to the surface to be soldered, and then the solder is applied at a temperature of about 350° C. The soldering flux serves to remove the metallic oxides from the surfaces to be soldered and also to keep such surfaces clean during the soldering process. As soldering proceeds, the advancing molten solder pushes the soldering flux aside. Spattering of the flux, solder and reaction products are eliminated or minimized with the present invention as previously explained.

Although specific examples and operating conditions have been set forth above with respect to this invention, it should be understood that the invention is to be construed by those skilled in the art as including such variations and modifications as are within the spirit and scope of the described invention as claimed hereinafter.

I claim:

1. A soldering flux, consisting essentially of:
   an acid anhydride having a molecular weight of less that about 800 which does not produce water during soldering, selected from the group consisting of (a) carboxylic acid anhydrides having at least nine carbon atoms, and (b) cyclic and substituted cyclic acid anhydrides and derivatives thereof wherein the ratio of the total number of carbonyl groups to carbon atoms is no greater that 1:4;
   a catalyst to promote the opening of the anhydride during soldering; and
   an anhydrous solvent which does not contain water as an impurity or react to form water during the soldering operation.

2. A soldering flux, consisting essentially of: an acid anhydride having the formula:

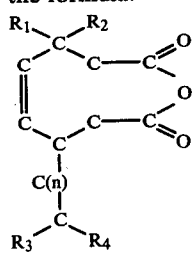

wherein $R_1$ and $R_2$ are hydrogen or an organic hydrocarbon radical, and $R_3$ and $R_4$ are hydrogen, an organic hydrocarbon radical, an hydroxyl group or oxygen, and n is an integer greater than 1:
   a catalyst to promote the opening of the anhydride during soldering; and
   an anhydrous solvent which does not contain water as an impurity or react to form water during the soldering operation.

3. The soldering flux of claim 2, wherein:
   $R_1$ is hydrogen; $R_2$ is an aliphatic group having five or six carbon atoms; $R_3$ is an hydroxyl group; $R_4$ is oxygen; and n is 7 or 8.

4. The soldering flux of claim 1, wherein:
   said catalyst to promote the opening of the anhydride ring during soldering is selected from the group consisting of salts or soaps of metallic ions, primary, secondary, and tertiary amines, benzylamines and substituted derivatives having a molecular weight greater than about 100.

5. The soldering flux of claim 1, wherein:
   said catalyst is selected from the group consisting of sodium stearate, potassium stearate, primary, secondary and tertiary alkyl amines, benzylamines and substituted derivatives having a molecular weight greater than about 100 and their salts with halogen acids, zinc chloride, manganese chloride, stannous chloride, stannic chloride, iron chloride, and aluminum chloride, any substance soluble in the flux composition containing one or more of the following ions. $Na^+$, $K^+$, $Cu^{++}$, $Zn^{++}$, $Mg^{++}$, $Sn^{++}$, $Sn^{++++}$, $Bi^{+++}$, $Sb^{+++}$, $As^{+++}$, $Pb^{++}$, $Cr^{+++}$, $Mn^{++}$, $Mo^{+6}$, $Ag^+$, $Fe^{++}$, $Fe^{+++}$, $Al^{+++}$, as salts or soaps of stearic or oleic acid, alkyl sulfates and sulfonic acids, benzene or substituted benzene sulfates and sulfonic acids, alkyl sulfates and sulfonic acids, halogen acids, and organo-metallic complexes.

6. The soldering flux of claim 1, wherein:
   said anhydrous solvent which does not contain water as an impurity or react to form water during the soldering operation is selected from the group consisting of isopropyl acetate, methyl cellosolve acetate, methyl isobutyl ketone, toluene and xylene.

7. A soldering flux, consisting essentially of:
   doric acid in an amount from about 15% by weight to about 60% by weight;
   stannous chloride catalyst in an amount from about 0.05% to about 5.0% by weight of the doric acid; and
   a solvent.

8. The soldering flux of claim 7, wherein the solvent is selected from the group consisting of isopropyl acetate, methyl cellosolve acetate, methylisobutyl ketone, toluene and xylene.

* * * * *